United States Patent [19]

Thompson

[11] Patent Number: 5,328,252
[45] Date of Patent: Jul. 12, 1994

[54] QUICK CHANGE WHEEL AND DRIVE ASSEMBLY FOR PASSENGER BOARDING BRIDGES

[75] Inventor: James E. Thompson, Garland, Tex.
[73] Assignee: Trinity Industries, Inc., Dallas, Tex.
[21] Appl. No.: 938,369
[22] Filed: Aug. 31, 1992
[51] Int. Cl.[5] .............................................. B60B 3/14
[52] U.S. Cl. ..................... 301/64.4; 301/6.5; 301/11.1; 301/35.62; 301/105.1
[58] Field of Search .......... 301/6.5, 9.1, 10.1, 301/11.1, 29.2, 35.51, 35.62, 64.4, 105.1

[56] References Cited

U.S. PATENT DOCUMENTS

| | | | |
|---|---|---|---|
| 1,251,920 | 1/1918 | Reichenberger | 301/108.4 X |
| 1,640,378 | 8/1927 | Schoenthal | 301/9.1 X |
| 2,479,162 | 8/1949 | Hare | 301/6.5 X |
| 2,559,975 | 7/1951 | Lange et al. | 301/10.1 |
| 2,688,761 | 7/1952 | Good, Jr. et al. | 14/71 |
| 3,060,471 | 10/1962 | Yuen et al. | 14/71 |
| 3,110,048 | 11/1963 | Bolton | 14/71 |
| 3,123,167 | 3/1964 | Lichti | 180/6.5 |
| 3,184,772 | 5/1965 | Moore et al. | 14/71 |
| 3,263,253 | 8/1966 | Wollard et al. | 14/71 |
| 3,263,254 | 8/1966 | Wollard et al. | 14/71 |
| 3,315,291 | 4/1967 | Wollard et al. | 14/71 |
| 3,377,638 | 4/1968 | Seipos | 14/71 |
| 3,462,784 | 8/1969 | Seipos | 14/71 |

FOREIGN PATENT DOCUMENTS

| | | | |
|---|---|---|---|
| 315897 | 5/1989 | European Pat. Off. | 301/10.1 |
| 298633 | 5/1929 | United Kingdom | 301/11.1 |
| 346725 | 10/1929 | United Kingdom | 301/64.4 |

*Primary Examiner*—Russell D. Stormer
*Attorney, Agent, or Firm*—Baker & Botts

[57] ABSTRACT

A wheel assembly and power drive train for use with passenger boarding bridges having a ramp drive system. The wheel assembly includes a wheel rim which is releasably attached to a wheel hub to allow removal of the wheel rim and associate tire without disassembly of the wheel hub and power drive train components mounted on the axle. Worn or flat tires may be replaced without disassembly of the power drive train or components such as bearings mounted on the axle.

19 Claims, 3 Drawing Sheets

QUICK CHANGE WHEEL AND DRIVE ASSEMBLY FOR PASSENGER BOARDING BRIDGES

TECHNICAL FIELD OF THE INVENTION

This invention relates in general to the field of passenger boarding bridges. More particularly, the present invention relates to passenger boarding bridges which are positioned with respect to a passenger carrying vehicle by a ramp drive system.

BACKGROUND OF THE INVENTION

Passenger boarding bridges frequently have a ramp drive system which includes a power source, control system, and drive train assembly to position the boarding bridge relative to a passenger carrying vehicle. A typical ramp drive system includes a wheel bogey with aircraft tires mounted on a two-piece cast aluminum wheel assembly with a sprocket gear bolted to the inside of the wheel assembly. Hydraulic, electric or other types of motors are connected by a drive chain to the wheel assembly sprocket gear. The power source or prime mover can be varied depending upon design requirements and the operating environment for each specific ramp drive system. The wheel assembly is mounted on an axle with bearings and other components associated with a power driven wheel assembly.

When a tire becomes flat or worn, all components in the wheel assembly must be removed and disassembled to gain access to the tire. After the tire has been replaced or repaired and reinstalled, the other components of the wheel assembly and drive train must also be reassembled. This is a cumbersome and time consuming task which may take the passenger boarding bridge out of service for considerable periods of time.

SUMMARY OF THE INVENTION

In accordance with the present invention, a quick change wheel assembly and improved power drive train are provided for use with passenger boarding bridges. The quick change wheel assembly and power drive train substantially eliminate or reduce disadvantages and problems associated with conventional ramp drive systems for passenger boarding bridges. The wheel assembly of the present invention allows repair or replacement of a worn or damaged tire without disturbing any drive train components.

The quick change wheel assembly of the present invention includes a wheel rim assembly with two metal halves or segments. A first set of bolts is used to hold the wheel rim halves together and a second set of bolts is used to attach the wheel rim to the wheel hub. The wheel rim and tire may be safely removed from the wheel hub without disassembly of power drive train components and a pre-inflated replacement tire and wheel rim installed.

In accordance with one aspect of the present invention, the first set of bolts which are used to hold the wheel rim halves together are positioned on the interior of the wheel rim when it is mounted on the wheel hub. The second set of bolts used to attach the wheel rim to the wheel hub are positioned on the exterior of the wheel rim when the wheel assembly is mounted on an axle. Therefore, the first set of bolts which hold the wheel rim halves together are inaccessible when the wheel rim is mounted on the wheel hub. This arrangement prevents inadvertent loosening of the first set of bolts and a possibly serious accident if an inflated tire is attached to the wheel rim. The second set of bolts is readily accessible to allow removal of the wheel rim and tire from the wheel hub.

An important technical advantage of the present invention is the ease of removing the wheel rim and tire from the wheel hub combined with the inherent safety of the first set of bolts which hold the wheel rim halves together not being accessible until after the wheel rim has been properly removed from the wheel hub.

The present invention eliminates the need to remove and reinstall power drive train components during replacement of a worn or flat tire. Since disassembly is no longer required on a frequent basis, a simple, rugged wheel hub may be used and the power drive train design simplified, resulting in increased reliability and reduced costs. The present invention makes possible a power drive train assembly which requires less machining of the axle shaft, allows use of permanently mounted and lubricated bearings, provides permanent mounting of the chain guard with more clearance, and offers better alignment with less wear and tear to the drive chain and sprocket gears.

BRIEF DESCRIPTION OF THE DRAWINGS

For a better understanding of the present invention, reference may be made to the accompanying drawings in which.

DETAILED DESCRIPTION OF THE INVENTION

The preferred embodiment of the present invention and its advantages are best understood by referring to FIGS. 1-4 of the drawings, like numerals being used for like and corresponding parts of the various drawings.

Passenger boarding bridges (not shown) which are used at airports frequently have one end of the boarding bridge attached to a passenger terminal (not shown) and the other end supported by movable column or lift column 28 to position the boarding bridge next to a passenger carrying vessel (not shown). The lift column is frequently attached to and rests on a wheel bogey.

Figure 1:
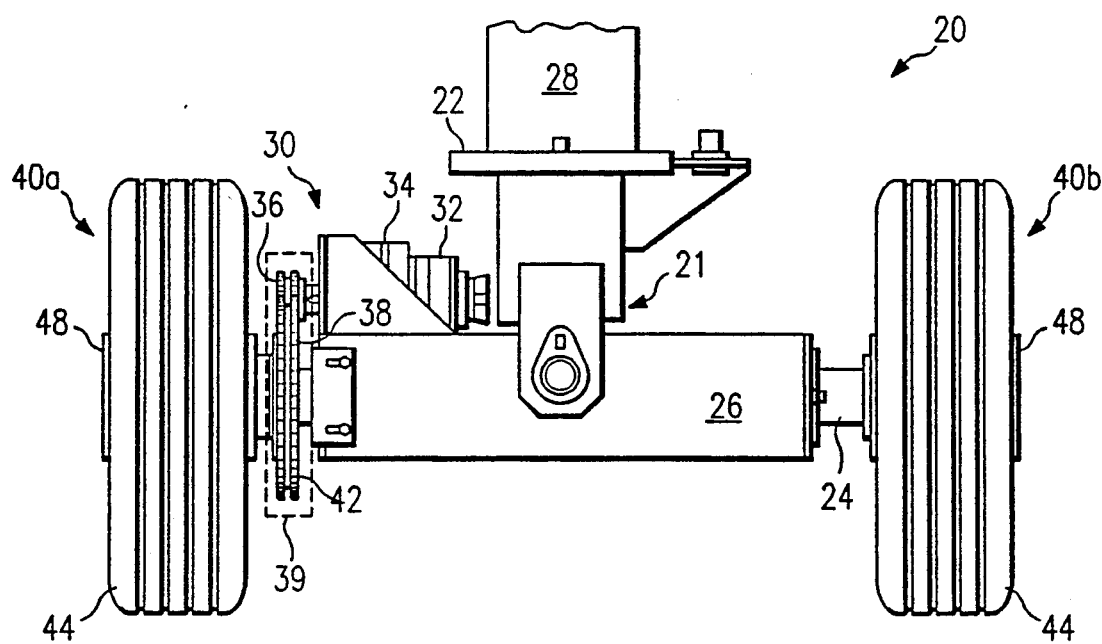
FIG. 1 is a schematic view in elevation with portions broken away showing a wheel bogey for a typical ramp drive system used with passenger boarding bridges.

FIG. 1 shows ramp drive system 20 which may be used with passenger boarding bridges to position the bridge adjacent to a passenger carrying vehicle. The basic components of ramp drive system 20 include wheel bogey 21 with trunnion support 22, axle 24, axle housing 26, power drive train assembly 30 and wheel assemblies 40a and 40b. Lift column 28 generally has one end resting on trunnion support 22 and the other end (not shown) attached to the passenger boarding bridge. Lift column 28 may contain or have attached control line conduits and/or power line conduits to operate power drive train assembly 30.

Weight from the passenger boarding bridge is transferred to wheel assemblies 40a and 40b via lift column 28, trunnion support 22, axle housing 26 and axle 24. Power drive train assembly 30 includes motor or power source 32, gearbox 34, power sprocket gear 36 and drive chain 38. Drive chain 38 connects power sprocket gear 36 with wheel assembly sprocket gear 42 of wheel assembly 40a. Chain guard 39, shown by dotted lines in FIG. 1, is usually installed to protect sprocket gears 36 and 42 and drive chain 38. Drive chain 38 is used to transfer power from motor 32 to wheel assembly 40a. FIG. 1 shows power drive train assembly 30 attached only to wheel assembly 40a. It is well known in the art to use dual power drive train assemblies such that both wheel assemblies 40a and 40b could be powered, if desired.

Figure 2:
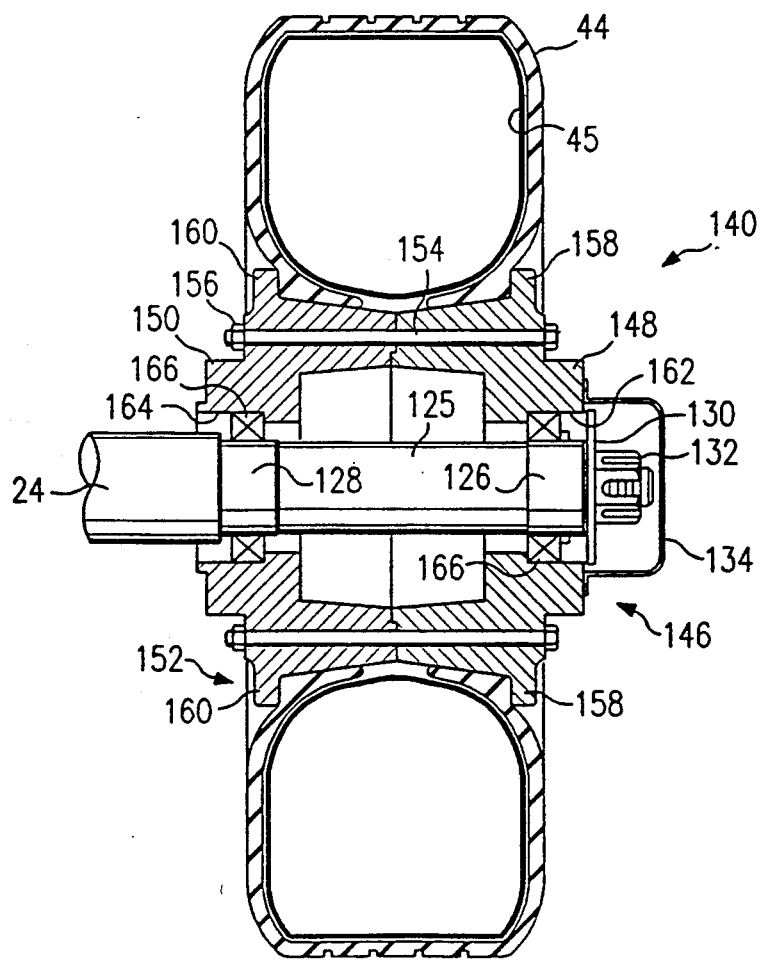
FIG. 2 is a drawing in section with portions broken away showing a conventional wheel assembly which is presently used with ramp drive systems such as shown in FIG. 1.

Conventional wheel assembly 140, shown in FIG. 2, can be used with ramp drive system 20 as either wheel assembly 40a or wheel assembly 40b. Tire 44 having an inner tube 45 is secured to wheel assembly 140 by two wheel halves 148 and 150. Outer wheel half 148 and inner wheel half 150 comprise both wheel rim portion 152 for securing tire 44 to wheel assembly 140 and wheel hub portion 146 for rotatably mounting wheel assembly 140 on axle 24. Wheel rim portion 152 and wheel hub portion 146 are integral parts of wheel assembly 140.

A plurality of wheel bolts 154 and nuts 156 are used to secure outer wheel half 148 with inner wheel half 150 to form wheel rim 152. Tire flange or shoulder 158 on outer wheel half 148 and tire flange or shoulder 160 on inner wheel half 150 cooperate with each other to trap tire 44 therebetween. Bolts 154 are accessible when wheel assembly 140 is mounted on axle 24 and may be mistakenly removed while removing wheel assembly 140.

Bearing recesses 162 and 164 are provided on the interior of wheel halves 148 and 150 respectively and partially define wheel hub portion 146. Bearings 166 are disposed in both recess 162 and recess 164 to rotatably support wheel assembly 140 on axle 24. The portion of axle 24 on which a wheel assembly is mounted is referred to as a wheel spindle. When wheel assembly 140 is mounted on axle 24, wheel spindle 125 must be modified to accommodate two bearings 166. This modification includes machining two bearing surfaces 126 and 128 which are aligned with bearing recesses 162 and 164, respectively, when wheel assembly 140 is mounted on axle 24. The requirement for two bearing surfaces 162 and 164 on wheel spindle 125 increases the cost of manufacturing axle 24 when used with wheel assembly 140.

After wheel assembly 140 has been installed on wheel spindle 125 along with bearings 166 and other components associated with wheel assembly 140, mounting plate 130, nut 132, and hub cap 134 are used to secure wheel assembly 140 to axle 24. As best shown in FIG. 2, if tire 44 needs to be replaced or repaired, all of the components of wheel assembly 140 must be removed from axle 24. If wheel assembly 140 is used with the power drive train 30, the connection (drive chain 38 and wheel assembly sprocket gear 42) between power drive train 30 and wheel assembly 140 must also be disconnected. The present invention eliminates the need for having two bearings 166, two machine surfaces 126 and 128 on axle 24, support plate 130, nut 132 and hubcap 134.

Figure 3A:
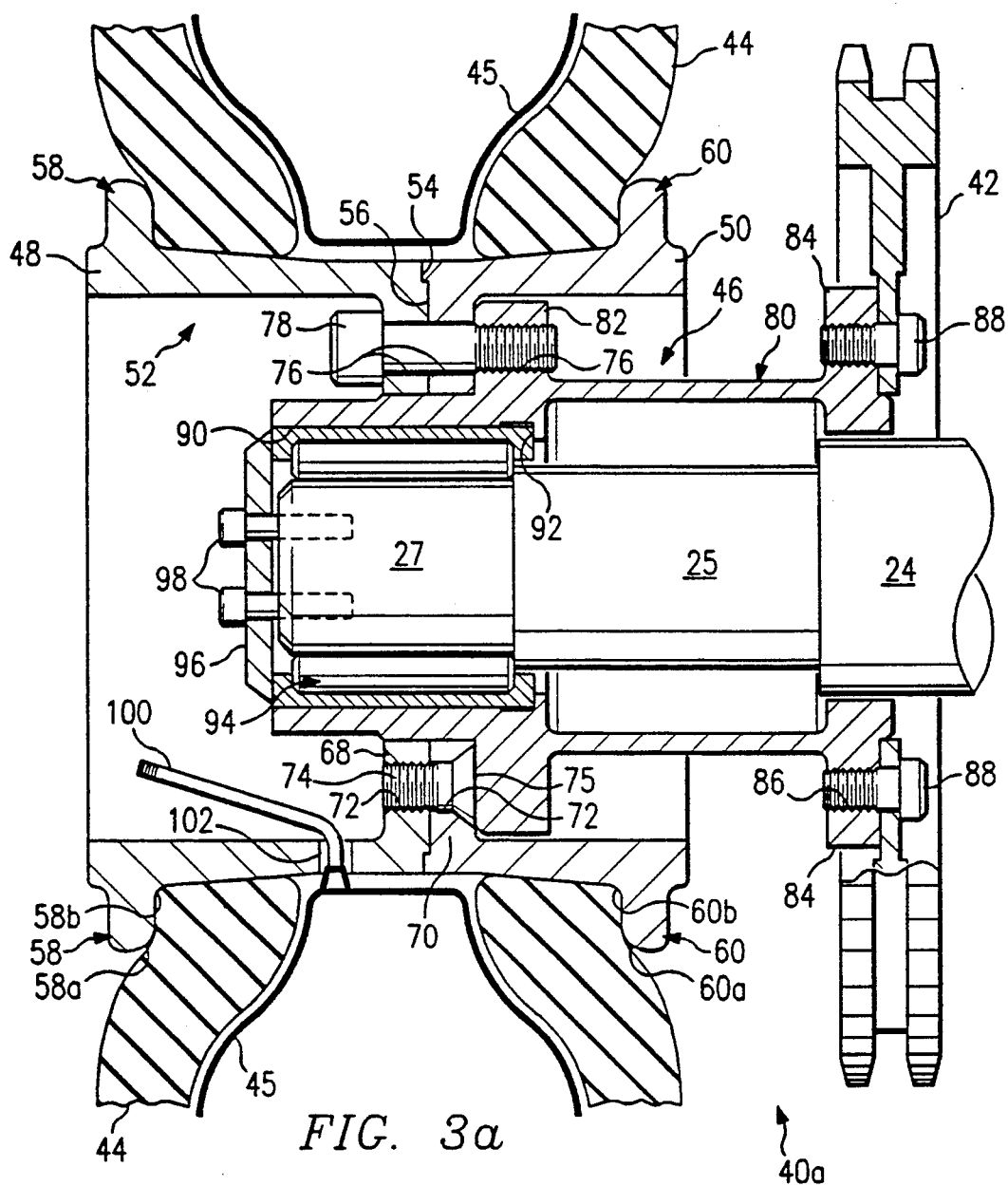
FIG. 3a is an enlarged drawing in section with portions broken away showing the wheel assembly and portions of the power drive train of the present invention which may be used with the ramp drive system shown in FIG. 1.

Wheel assembly 40a shown in FIG. 3a has two main subassemblies, wheel rim 52 and wheel hub 46. The present invention allows removal of wheel rim 52 and tire 44 without disturbing the attachment of wheel hub 46 with axle 24 and power drive train assembly 30. Wheel rim 52 comprises outer wheel rim half or segment 48 and inner wheel rim half or segment 50, tire flange or shoulder 58 on outer wheel rim half or segment 48 and tire flange or shoulder 60 on inner wheel rim half or segment 50 provide means for securing inflatable tire 44 to wheel rim 52. Outer wheel rim half 48 and inner wheel rim half 50 have a generally hollow cylindrical configuration with tire flanges 58 and 60 projecting radially outward from the exterior of wheel rim 52. Matching pilots 54 and 56 are provided on outer wheel rim half 48 and inner wheel rim half 50 respectively to assist with assembly of wheel rim 52.

Mounting flanges 68 and 70 are provided on the inside diameter of wheel rim halves 48 and 50, respectively. Mounting flanges 68 and 70 have a plurality of openings or bolt holes which are aligned with each other when wheel rim halves 48 and 50 are joined together to form wheel rim 52. One set of bolt holes 72 are sized to receive bolt 74 which hold wheel rim halves 48 and 50 together to form wheel rim 52. A second set of bolt holes 76 are also provided in mounting flanges 68 and 70. The diameter of bolt holes 76 is larger than the diameter of bolt holes 72. Bolt holes 76 cooperate with bolts 78 to provide means for attaching wheel rim 52 to wheel hub 46. Bolt holes 72 and 76 are alternately spaced around the circumference of mounting flanges 68 and 70.

Figure 3B:
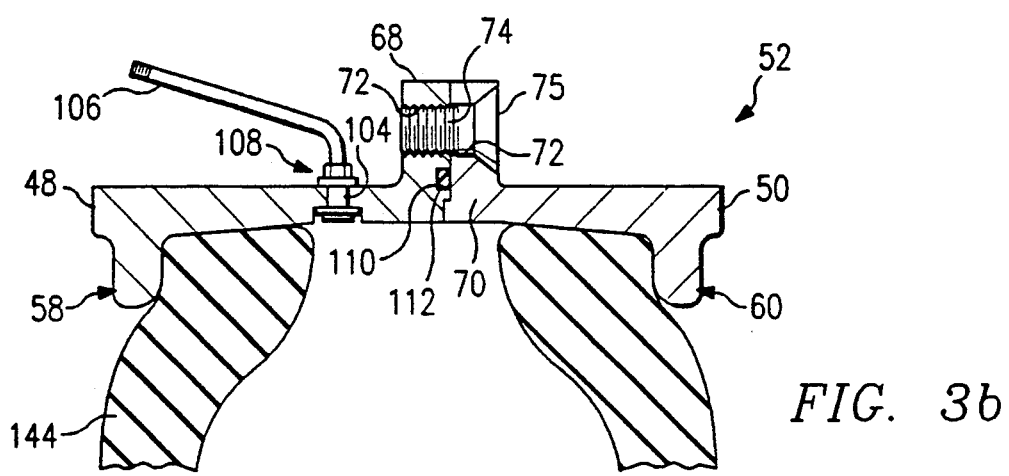
FIG. 3b is an enlarged drawing in section with portions broken away showing the wheel rim of the present invention modified for use with tubeless tires.
Figure 4:
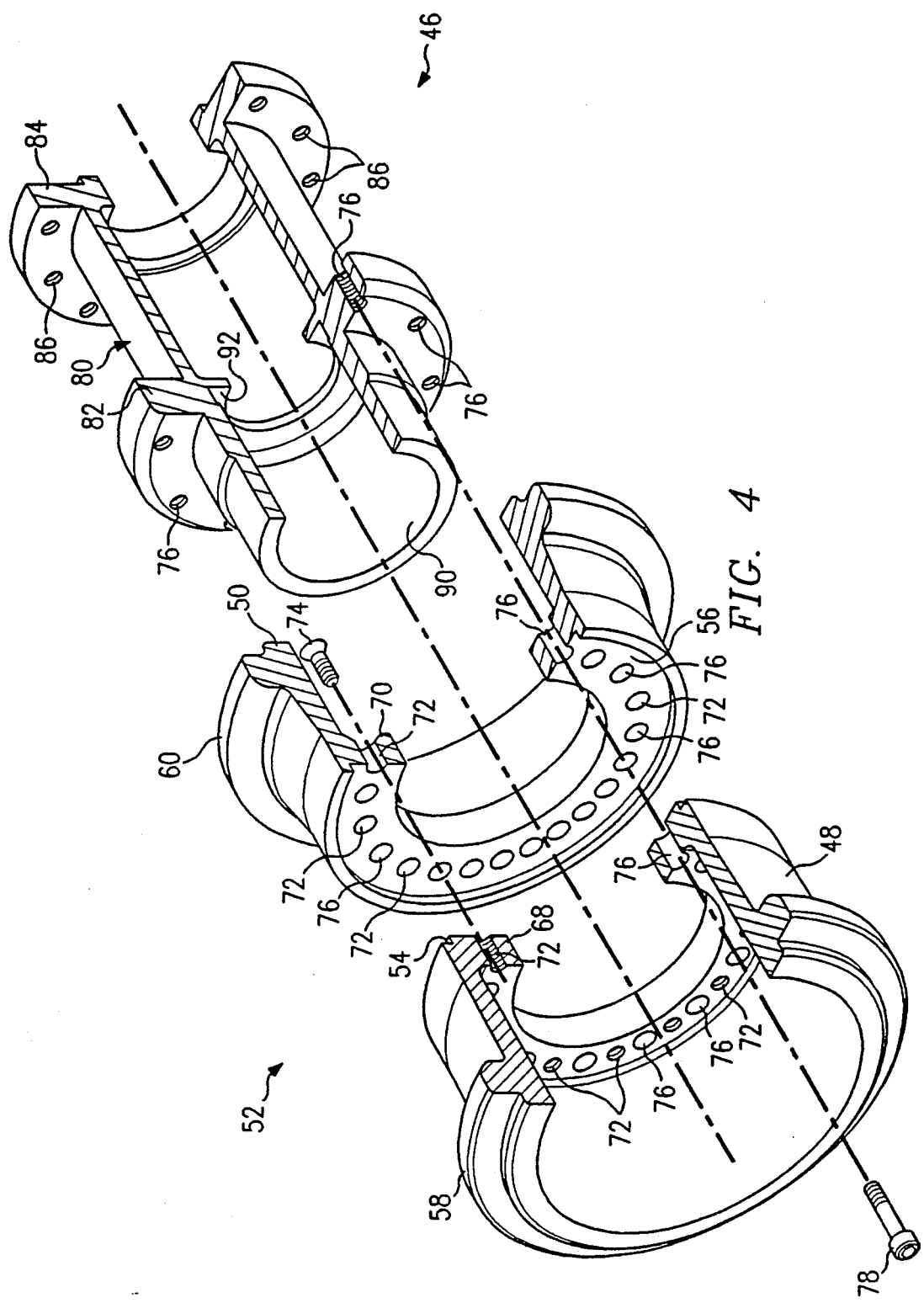
FIG. 4 is an expanded isometric drawing in section and elevation with portions broken away showing the wheel rim and portion of the wheel hub and power drive train connector of the present invention.

As shown in FIGS. 3a, 3b and 4, bolts 74 may be substantially smaller than bolts 78. Bolts 74 preferably have flat head 75 which is counter sunk flush with mounting flange 70. Bolt holes 72 in mounting flange 68 are threaded to receive bolts 74. When wheel assembly 40a is installed on axle 24, heads 75 of bolts 74 are not accessible. Only bolts 78 are accessible when wheel assembly 48 is mounted on axle 24. This configuration provides an important safety feature of the present invention. Wheel rim subassembly 52 cannot be inadvertently disassembled while removing wheel rim 52 and tire 44 from wheel hub 46. After wheel rim 52 has been removed from wheel hub 46, tire 44 must be completely deflated before disassembling outer wheel rim half 48 from inner wheel rim half 50. This same requirement applies to conventional wheel assembly 140. The difference is that bolts 74 are not accessible as compared to bolts 154 until after the wheel rim 52 and tire 44 have been removed from wheel hub 46.

Wheel hub 46 is secured to wheel spindle 25 of axle 24. Wheel spindle 25 has only one bearing surface 27. Wheel hub 46 includes housing 80 which has the general configuration of a hollow cylinder with a longitudinal opening extending therethrough to receive wheel spindle 25. The various components which comprise wheel hub subassembly 46 are attached to or carried by housing 80. Mounting flanges 82 and 84 are provided on the exterior of housing 80 for attachment with wheel rim 52 and sprocket gear 42, respectively. Bolt holes 76 are provided in mounting flange 82 for alignment with matching bolt holes 76 in wheel rim 52. A plurality of bolt holes 86 are provided in mounting flange 84 to provide means for attaching sprocket gear 42 to wheel assembly 40a. Bolt holes 76 and 86 in flanges 82 and 84 respectively are threaded to accept bolts 78 and 88 respectively. Sprocket gear 42 may sometimes be referred to as a "driven sprocket" or "wheel sprocket."

Bearing recess 90 is provided on the interior of housing 80 to receive cartridge bearing 94 therein. Bearing recess 90 includes shoulder 92 which aids in properly positioning cartridge bearing 94 within recess 90. Bearing 94 is selected to fit over bearing surface 27 and allow mounting wheel hub subassembly 46 on axle 24. Bearing 94 allows rotation of wheel assembly 40 relative to axle 24. End cap 96 is bolted to wheel spindle 25 with a plurality of screws 98. Cartridge bearing 94, bearing cap 96 and cap screws 98 are commercially available from various sources. A set of bearings, bearing end caps and bearing screws satisfactory for use with the present invention can be obtained from the Timken Company. Various types of bearings including tapered roller bearings may be satisfactorily used with wheel hub 46. The inside diameter of bearing recess 90 in housing 80 is selected to have a pressed tight fit with the outside diameter of bearing cartridge 94. This pressed fit assists with maintaining the position of wheel assembly 40a relative to axle 24.

Tire flanges 58 and 60 preferably have rounded shoulders 58a and 60a and smooth fillets 58b and 60b respectively for engagement with inflatable tires 44 and 144 in a manner which minimizes stress from securing tires 44 and 144 with wheel rim 52. As shown in FIG. 3a, inflatable tire 44 includes inner tube 45. Valve stem 100 extends from inner tube 45 through opening 102 in wheel rim 52. As shown in FIG. 3b, the present invention allows modification of wheel rim 52 to accommodate tubeless tire 144. The modification includes providing opening 104 in outer wheel rim half 48. Valve stem 106 and valve stem fitting 108 are secured to opening 104 for use in inflating tubeless tire 144. Outer wheel rim half 48 has been further modified to include O-ring groove 110 and O-ring 112 to provide a fluid tight seal between outer wheel rim half 48 and inner wheel rim half 50. O-ring groove 110 and O-ring 112 cooperate to provide the required barrier to prevent air from escaping from tubeless tire 144. Depending upon design requirements, O-ring groove 110 and O-ring 112 could be placed in inner wheel rim half 50 as desired.

A plurality of bolts 88 are used to attach sprocket gear 42 with mounting flange 84 of housing 80. Sprocket gear 42, bolts 88, bolt holes 86, mounting flange 84, and housing 80 cooperate to provide means for transferring power from drive train assembly 30 to wheel hub 46. Since wheel rim 52 is secured to wheel hub 46 by bolts 78, rotation of wheel hub 46 results in rotation of wheel rim 52 and tire 44.

ALTERNATIVE EMBODIMENTS

The present invention has been described with respect to a passenger boarding bridge which might be found at an airport. Those skilled in the art will readily note that a passenger boarding bridge incorporating elements of the present invention could also be used at cruise ship docking facilities or any other facility when it is desired to move passengers from a fixed structure to a moveable vehicle.

The present invention has been described with respect to a ramp drive system having only one "drive wheel". Those skilled in the art will readily note that the present invention can be used with dual drive wheel systems. Also, the present invention may be used with supporting wheels that do not include a power drive system. Wheel assembly 40b shown in FIG. 1 is an example of such a supporting wheel.

The present invention has also been described with respect to a ramp drive system using sprocket gears and a drive chain to transfer power from the prime mover to the wheel assembly. Those skilled in the art will readily appreciate that drive chain 38 could be replaced with a direct drive connection from a hydraulic, electric or other suitable motor.

The present invention has been described with respect to using inflatable tire 44 on both conventional wheel assembly 140 and new wheel assembly 40. One modification for use with tubeless tire 144 has also been shown. Those skilled in the art will readily appreciate that wheel rim 52 of the present invention may be further modified to allow using over-sized tires or specially designed tires with wheel assembly 40. The present invention allows much greater flexibility in selecting tires for use with wheel bogey 21.

Wheel rim 52 is shown with wheel rim halves or segments 48 and 50 having approximately the same dimensions. Those skilled in the art will readily note that wheel assemblies may be manufactured in accordance with the present invention with segments 48 and 50 representing respectively more or less than one-half of the complete wheel rim 52.

Although the present invention has been described in detail, it should be understood that various changes, substitutions and alterations can be made without departing from the spirit and scope of the present invention which is described in the following claims.

What is claimed is:

1. A wheel assembly for use with a passenger boarding bridge comprising:

a wheel rim with means, including a first set of bolts, for mounting a tire on the wheel rim;

the wheel rim having an inner wheel rim segment and an outer wheel rim segment with the inner wheel rim and the outer wheel rim disposed axially with respect to each other;

means, including the first set of bolts, for securing the outer wheel rim segment with the inner wheel rim segment;

a wheel hub with means for attaching the wheel hub to an axle;

means, including a second set of bolts, for releasably attaching the wheel rim to the wheel hub;

the first set of bolts and the second set of bolts disposed radially adjacent to each other on the wheel rim; and the wheel rim and the wheel hub cooperating with each other to prevent access to the first set of bolts when the wheel rim is attached to the wheel hub and to provide means for preventing removal of the tire from the wheel rim until after the wheel rim has been removed from the wheel hub.

2. The wheel assembly as set forth in claim 1 wherein the means for mounting a tire on the wheel rim further comprises:

a tire flange on the inner wheel rim segment and a tire flange on the outer wheel rim segment; and a mounting flange on the inner wheel rim segment and a mounting flange on the outer wheel rim segment.

3. The wheel assembly as set forth in claim 2 further comprising an inflatable tire secure between the tire flanges of the inner wheel rim segment and outer wheel rim segment.

4. A wheel assembly as set forth in claim 1 wherein means for mounting a tire on the wheel rim further comprises:
- a rounded portion on the tire flanges of the inner wheel rim segment and the outer wheel rim segment; and
- a fillet portion on the tire flanges of the inner wheel rim segment and the outer wheel rim segment.

5. A wheel assembly as set forth in claim 1 wherein the means for securing the outer wheel rim segment with the inner wheel rim segment further comprises:
- a mounting flange on the inner wheel rim segment and a mounting flange on the outer wheel rim segment;
- a plurality of bolt holes extending through each mounting flange with a portion of the bolt holes corresponding in size to the first set of bolts; and
- the first set of bolts used with the corresponding bolt holes to attach the mounting flange of the wheel rim segments to each other.

6. A wheel assembly as set forth in claim 1 wherein the means for attaching the wheel hub to an axle further comprises:
- a housing with a longitudinal opening extending therethrough to receive a wheel spindle formed on the axle;
- a bearing recess formed on the interior of the housing; and
- a bearing disposed within the bearing recess between the housing and the wheel spindle.

7. A wheel assembly as set forth in claim 6 wherein the means for attaching the wheel hub to an axle further comprises:
- a shoulder within the bearing recess for abutment with the bearing; and
- a bearing cap with a plurality of screws for attachment of the bearing to the wheel spindle.

8. A wheel assembly as set forth in claim 1 wherein the means for releasably attaching the wheel rim to the wheel hub further comprises:
- a mounting flange extending radially outward from the wheel hub;
- a mounting flange extending radially inward from the wheel rim; and
- means for releasably securing the mounting flange of the wheel rim to the mounting flange of the wheel hub.

9. A wheel assembly as set forth in claim 8 wherein the means for releasably securing the mounting flange of the wheel rim to the mounting flange of the wheel hub comprising:
- a plurality of bolt holes extending through the mounting flange of the wheel rim and the mounting flange of the wheel hub;
- a portion of the bolt holes in the mounting flange of the wheel rim corresponding in size to the second set of bolts; and
- the second set of bolts engaged with the corresponding bolt holes in the mounting flange of the wheel rim and the bolt holes in the mounting flange of the wheel hub.

10. A wheel assembly and power drive train for use with a ramp drive system to position a passenger boarding bridge comprising:
- a wheel rim with means, including a first set of bolts, for mounting a tire on the wheel rim;
- a wheel hub with means for attaching the wheel hub to an axle;
- means, including a second set of bolts, for releasably attaching the wheel rim to the wheel hub;
- means for supplying power to the wheel hub from the power drive train; and
- the wheel rim and the wheel hub cooperating with each other to prevent access to the first set of bolts when the wheel rim is attached to the wheel hub.

11. The wheel assembly as set forth in claim 10 wherein the means for mounting a tire on the wheel rim further comprises:
- the wheel assembly having an inner wheel rim segment and an outer wheel rim segment with the inner wheel rim and the outer wheel rim disposed axially with respect to each other;
- a tire flange on the inner wheel rim segment and a tire flange on the outer wheel rim segment; and
- means, including a first set of bolts, for securing the inner wheel rim segment with the outer wheel rim segment.

12. A wheel assembly as set forth in claim 11 wherein the wheel rim further comprises:
- a mounting flange on the inner wheel rim segment and a mounting flange on the outer wheel rim segment; and
- the first set of bolts used to attach the mounting flanges of the wheel rim segments to each other.

13. A wheel assembly as set forth in claim 10 wherein the means for attaching the wheel hub to an axle further comprises:
- a housing with a longitudinal opening extending therethrough to receive a wheel spindle formed on the axle;
- a bearing recess formed on the interior of the housing; and
- a bearing disposed within the bearing recess between the housing and the wheel spindle.

14. A wheel assembly as set forth in claim 10 wherein the means for releasably attaching the wheel rim to the wheel hub further comprises:
- a first mounting flange extending radially outward from the wheel hub;
- a mounting flange extending radially inward from the wheel rim; and
- means for releasably securing the mounting flange of the wheel rim to the first mounting flange of the wheel hub.

15. A wheel assembly as set forth in claim 10 wherein the means for supplying power to the wheel hub from the power drive train further comprises:
- a second mounting flange extending radially outward from the wheel hub;
- a sprocket gear attached to the second mounting flange of the wheel hub; and
- means for connecting the power drive train with the sprocket gear.

16. A wheel assembly as set forth in claim 15 wherein the means for connecting the power drive train with the sprocket gear further comprises a drive chain extending from the power drive train to the sprocket gear.

17. A wheel assembly for use with a power drive train to position a passenger boarding bridge comprising:
- a wheel rim with means, including a first set of bolts, for mounting a tire on the wheel rim;
- the wheel rim having an inner wheel rim segment and an outer wheel rim segment, with the inner wheel rim and the outer wheel rim disposed axially with respect to each other;

a wheel hub with means for attaching the wheel hub to an axle;

means, including a second set of bolts, for releasably attaching the wheel rim to the wheel hub;

means for preventing removal of the tire from the wheel rim until after the wheel rim has been removed from the wheel hub; and means for supplying power to the wheel hub from the power drive train.

18. A wheel assembly as set forth in claim 17 further comprising:

the first set of bolts used to connect the inner wheel rim segment with the outer wheel rim segment;

the second set of bolts used to attach the wheel rim with the wheel hub; and the first set of bolts and the second set of bolts providing a portion of the means for preventing removal of the tire from the wheel rim until after the wheel rim has been removed from the wheel hub.

19. The wheel assembly as set forth in claim 17 wherein the means for mounting the tire on the wheel rim further comprises:

an O-ring disposed in a groove between the inner wheel rim segment and the outer wheel rim segment to form a barrier between the wheel rim segments;

a valve stem secured to and extending through the wheel rim;

a tire flange on the inner wheel rim segment and a tire flange on the outer wheel rim segment; and a tubeless tire secured between the tire flanges of the wheel rim segments.

* * * * *